United States Patent [19]

Mitra

[11] Patent Number: 5,577,235
[45] Date of Patent: Nov. 19, 1996

[54] MICROCONTROLLER WITH MULTIPLE TIMING FUNCTIONS AVAILABLE IN A SINGLE PERIPHERAL MODULE

[75] Inventor: Sumit K. Mitra, Tempe, Ariz.

[73] Assignee: Microchip Technologies, Inc., Chandler, Ariz.

[21] Appl. No.: 298,775

[22] Filed: Aug. 31, 1994

[51] Int. Cl.$^6$ .............................. G06F 9/22; G06F 19/00
[52] U.S. Cl. ..................... 395/559; 364/DIG. 2; 364/925.6; 364/926.9; 364/933.7
[58] Field of Search ............................................. 395/550

[56] References Cited

U.S. PATENT DOCUMENTS

| | | | |
|---|---|---|---|
| 4,061,881 | 12/1977 | Widl ........................................... | 179/15 |
| 4,165,490 | 8/1979 | Howe, Jr. ................................... | 328/60 |
| 4,244,258 | 1/1981 | Finch ........................................ | 84/1.03 |
| 4,321,687 | 3/1982 | Parsons ..................................... | 364/900 |
| 4,339,819 | 7/1982 | Jacobson ................................... | 371/16 |
| 4,745,573 | 5/1988 | Lebel ........................................ | 364/900 |
| 4,858,178 | 8/1989 | Breuninger ............................... | 364/900 |
| 4,881,040 | 11/1989 | Vaughn ..................................... | 328/61 |
| 4,922,137 | 5/1990 | Small ........................................ | 307/480 |
| 5,248,900 | 9/1993 | Davis ......................................... | 307/265 |
| 5,446,864 | 8/1995 | Burghardt et al. ....................... | 395/427 |
| 5,454,114 | 9/1995 | Yach et al. ............................... | 395/750 |

Primary Examiner—Thomas M. Heckler
Attorney, Agent, or Firm—Wigman, Cohen, Leitner & Myers, P.C.

[57] ABSTRACT

A microcontroller chip with a central processing unit (CPU) is adapted to control an external system with which the device is to be installed in circuit. The microcontroller chip includes an on-chip peripheral universal timing function module with a register for storing a value selected to signify a distinctive event in a waveform. A timer generates a series of values as a function of time as a measure of the value selected to signify the distinctive event. The register and the timer are coupled to a pin of the microcontroller chip on which said waveform is to be applied. Equality between the values in the timer and the register signify the distinctive event as one of a capture and a compare of an event in the waveform, to generate an interrupt to the CPU. The register is selectively split into separate master and slave registers for automatic synchronization of the transfer of a value entered into the master register to the slave register with a repetitive boundary of the waveform, to provide selective pulse width modulation of the waveform.

10 Claims, 3 Drawing Sheets

MICROCONTROLLER WITH MULTIPLE TIMING FUNCTIONS AVAILABLE IN A SINGLE PERIPHERAL MODULE

BACKGROUND OF THE INVENTION

The present invention relates generally to a class of semiconductor microprocessors utilized as microcontrollers to perform selective control functions on an external controlled system.

Microcontrollers having all peripherals embedded on the same single microcontroller chip have become increasingly popular in a large number of diverse control applications. These include, for example, pocket pagers, meters and testers, keyboard controllers capable of offloading many tasks which would otherwise require handling by the processor in personal computers, modems for command interpretation and data transmission, printer buffers for high speed data dumping, color plotters, color copiers, electronic typewriters, cable TV terminal equipment, lawn sprinkling controllers, credit card phone equipment, automotive applications including engine control modules, antilock braking systems, user-adjustable suspension control, and various other applications in industrial controls, telecommunications, automotive, appliance, computer and consumer markets.

Real time microcontrollers provide rapid solutions to signal processing algorithms and other numerically intensive computations, control events such as opening and closing of relays, position and speed of a motor, and other control functions. The central processing unit (CPU) of the microcontroller operates in conjunction with certain peripherals to perform the control function, including timers, signal ports, baud rate generators, and others.

Microcontrollers generally have one or more timers (typically registers which are, say, 8 or 16 bit wide) on board (i.e., integrated within the circuitry of the single chip itself). These timers are generally utilized to implement various timing functions. One such timing function may be a capture function, which enables recording a time stamp of the occurrence of an event of interest. For example, the event of interest may be a change in the logic state at an external pin, from "0" to "1", or "1" to "0". To capture the precise moment at which the pin change occurs, a 16 bit wide timer might be used together with a 16 bit wide shadow register that acts as a capture register. When the pin bit value changes, the timer value (count) is captured on the shadow register. Upon completion of the transfer, an interrupt is generated to the CPU of the microcontroller. Then, after the CPU has completed the task it was performing when the change took place, it can check on the timing of the event of interest at its leisure.

Thus, the availability of the capture register eliminates a need for the CPU to constantly monitor the pin for changes in state. Instead, the CPU is relieved, or "freed up" to perform its other tasks efficiently without wasted time, and, when time permits or when necessary, to make an inquiry to the shadow register to determine when the change in the logic state of the pin actually took place.

One practical example of the utility of the capture function is in the case of a pulse input to a pin. Capture can be set to occur on the rising edge of the pulse, and then on the falling edge. The two values can later be read, and subtracted from one another to calculate the width of the pulse in increments of time—a simple technique to measure pulse width. For this and similar purposes, the capture function enjoys widespread use in microcontrollers.

Another timing function commonly used in microcontrollers is a compare function, which is the opposite of the capture function. It may be desired to generate an event of some type, such as a pulse, or a change in logic state of a pin. Here again, a time base is provided by the timer (e.g., 16 bit wide), but in this case the associated shadow register is used to write the value or time stamp for the desired time of occurrence of the event. In this mode of operation, the shadow register is referred to as a "compare register".

Assume, for example, that the timer is in the midst of a count that commenced at zero and is heading toward 65,535 (i.e., a 16 bit value), and the logic state of the pin is to be set to change when the timer count reaches 10,000. In that case, the compare register is written to 10,000, and when the timer count matches that value, a 'match' signal is generated by the compare register to toggle the pin and thereby initiate the logic state change. Another value may be written to the compare register indicative of the timing of another event, such as a timer count of 20,000 to evoke a 'match' signal for resetting the pin to its previous logic state. The effect is that a pulse of predetermined width is generated at the pin with precise timing, by use of the compare function.

Thus, the compare function of the microcontroller device allows the user to set an event to occur at a precise specified time or times. Changing the logic state of a pin is, of course, only one of many examples that could be cited. Other examples of events provided by this function include initiating a serial transmission, initiating an analog to digital conversion, or generating a software interrupt, to name a few. The choice of the desired event is, quite simply, a matter for the discretion of the microcontroller device user, whose interest is typically to achieve some objective in the external system controlled by the device.

Yet another timing function commonly employed in microcontrollers is Pulse Width Modulation (PWM). The PWM function involves repetitive events, in contrast to the single occurrence event 'capture' and 'compare' functions. If a capture is set—for example, it may be for the rising edge of a pulse—the value is read upon occurrence of that event, and then capture may be set for the next desired event. The compare function is handled in much the same way. A compare value may be set to toggle a pin, for example, and once that event is completed, another event may be scheduled.

With PWM, a repetitive waveform may be generated at a pin, with a period in which the pin is at one logic state (e.g., high) for a specified time interval, and at another logic state (e.g., low) for another specified time interval. The timing of the high and low states is selected to modulate the width of the pulse. The period of the PWM is the sum of the high and low intervals, and is determined by the timer.

PWM is especially useful to generate analog signals. For an 8 bit entity, for example, the pulse width may be set at any value between 0 and 255. A large number is thereby encoded into a digital signal, which is then used to generate an analog signal for performing the desired function, such as to drive a motor. The motor can be run at a slow rate by making the pulse width commensurately small, and at a faster rate by concomitantly increasing the pulse width.

In conventional microcontroller designs, timing functions of capture, compare and PWM are implemented and utilized separately from one another. One register is assigned to perform a compare function, another register allocated to a capture function, and still another to a PWM function, if the microcontroller includes one each of capture, compare and PWM functions. Certain microcontroller applications, however, require more than one of the same timing function. For instance, a three-phase motor control application typically requires three PWM outputs, while a four wheel anti-skid braking system application may require three or four capture inputs to measure wheel speeds. Yet another application may require a large number of compare functions.

Conventional microcontrollers, however, lack the capability to satisfy multiple timing function requirements of various different customer applications with a single device. A solution to this problem might be achieved by providing multiple capture, compare, and pulse width modulation functions on each chip. But such a solution would significantly increase the chip cost, and hence market price, with the result that the device would lose its attraction in the broader market, and tend to be restricted to only a relative few customer applications.

Accordingly, it is a principal object of the present invention to provide a single chip general purpose microcontroller or microprocessor device having multiple timing functions available and integrated into a single peripheral module to allow flexibility while minimizing die area and cost.

Another object is to provide such a device that allows each user to select the specific type and number of timing functions according to the needs of the particular user application for the device.

SUMMARY OF THE INVENTION

The present invention satisfies a wide variety of needs arising from different customer or user applications, without requiring a multiplicity of peripherals, each having fixed functionality and consequent high chip cost.

The solution provided by the invention takes advantage of the fact that all of the functions involved are timing functions—each of them employs registers that use a time base to perform an operation. It becomes possible, then, to designate a single register which may be utilized to perform any of the various timing functions. Instead of a chip having one capture register, one compare register, and one PWM register, a single register may be made available for any of the three functions. Even more significantly, it becomes possible to provide any or all of the timing functions—capture, compare, and PWM—in one register or Capture/Compare/PWM (CCP[1]) module with relatively little overhead increase relative to that applicable to a conventional (dedicated single function) register.

[1]CCP is a trademark of Microchip Technology Incorporated, the assignee of the invention disclosed and claimed in this specification.

A multiple timing function (multi-function) register is necessarily somewhat larger than a dedicated single function register, but can be considerably smaller than three times the size of the dedicated register. Indeed, in a sample working chip the multifunction register was fabricated in less than twice the size of a conventional dedicated register, with a resulting overall overhead saving.

The present invention, then, provides a one-chip microcontroller having multiple timing functions available in a single integrated peripheral module. Moreover, the user has the luxury to designate which one of the capture, compare and PWM functions is to be used in the single module for his particular application. Any format may be selected for use with the single multi-function module of the invention, but the currently preferred embodiment constituting the best mode presently contemplated to practice the invention is implemented with 16 bit wide registers.

A single chip need not be confined to one multi-function module, but instead may have a plurality of such modules. The individual user can configure each module as desired for the user's particular application—capture, compare or PWM. For example, a chip having four modules might use three modules for PWM functions and the fourth module for a capture function, or all of them for the capture mode, or any other combination. A further advantage of the present invention is that it is not necessary to duplicate the timer(s), because all of the modules may share the same timer(s).

The manufacturer has the advantage of providing a generalized chip that satisfies the availability of all the different timing functions on a user-selective basis. The underlying concept is the availability of selectable multiple timing functions in one module, without need to occupy X times as much silicon area as is occupied by a single conventional module (where X is the number of different timing functions—in this example, three—made available to the user).

Therefore, another object of the invention is to provide a microcontroller chip which has all timing functions, including capture, compare and pulse width modulation, selectively available in a single on-board or on-chip module.

BRIEF DESCRIPTION OF THE DRAWINGS

The above and still further objects, features, aspect and attendant advantages of the invention will become apparent from a consideration of the following detailed description of the best mode of carrying out the invention as presently contemplated, taken in conjunction with the accompanying drawings in which.

DETAILED DESCRIPTION OF THE PREFERRED EMBODIMENT AND METHOD

Figure 1:
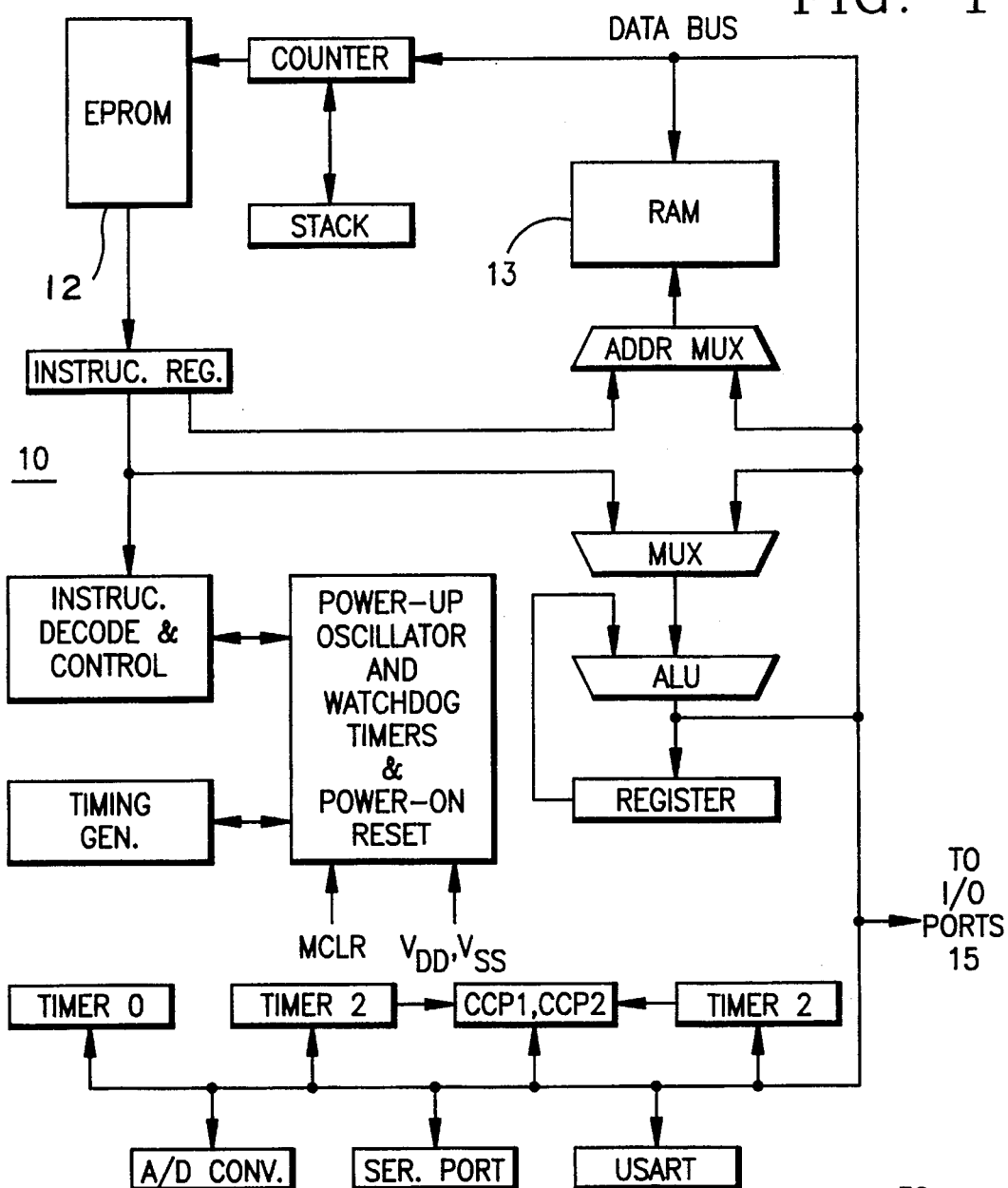
FIG. 1 is a simplified block diagram of a single chip microcontroller device in which the CCP™ modules of the invention are implemented.

FIG. 1 is a block diagram of the relevant portion of a semiconductor integrated circuit (IC) programmable microcontroller device fabricated on a single silicon chip and having a plurality of integrated peripheral timing function modules, each of which may be configured and reconfigured (i.e., programmed and reprogrammed) at will by the user, in accordance with the present invention, to provide specific timing functions required by the particular user application of the device. The microcontroller chip 10 of FIG. 1 includes, among other elements, an EPROM (Electrically Programmable Read Only Memory) program memory 12, a RAM (Random Access Memory) data memory 13, I/O (Input/Output) ports 15, and other functions which, although essential, are not of particular interest to the description of the present invention and therefore need not be discussed here.

The microcontroller has several timing function modules CCP1, CCP2, etc. with associated timer(s). Each of the two (or more) on-chip CCP™ peripheral modules CCP1 and CCP2 includes a 16-bit universal register which can operate as any of the timing function or mode registers of the chip. Specifically, each universal register operates selectively as either a 16-bit capture register, a 16-bit compare register, or an 8bit PWM register.

Each universal register comprises two 8-bit sections, both of which are readable and writable. One section is low byte and the other is high byte. In the exemplary embodiment illustrated in the Figures, the microcontroller chip has an 8-bit CPU (Central Processing Unit), an 8-bit wide integral dambus, so all of the registers are read from and written to as 8-bit entities. If, however, the CPU were 16-bit, a single 16-bit register implementation would be usable.

Figure 2:
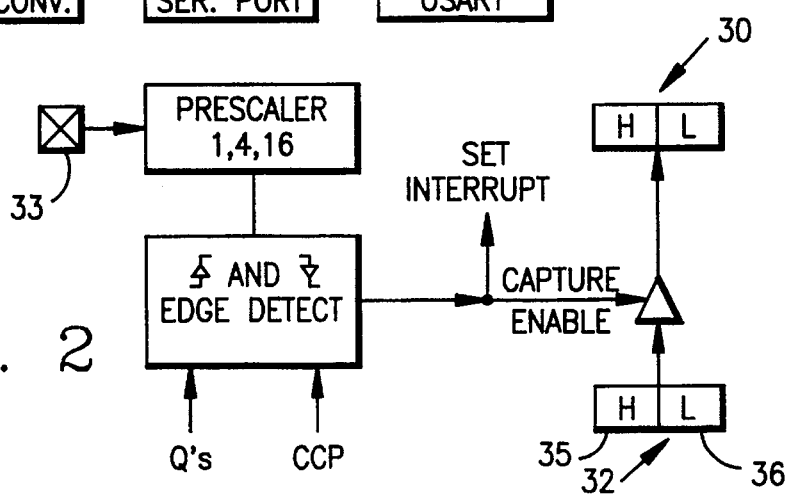
FIG. 2 is a simplified block diagram illustrating the capture mode operation of the device of FIG. 1.

Referring to FIG. 2, in the capture mode of the device of the present invention, register 30 captures (enters) the 16 bit value of an associated timer 32 when an event (signified by a change of logic state) occurs on external pin 33. By way of example and not limitation, an event may be defined as any one of (1) a rising edge, (2) a falling edge, (3) every four rising edges, and (4) every sixteen rising edges, on pin 33. Any event from among these events is selected by state changes controlled by the user. When a capture is made, an interrupt request flag is set. Interrupts, of course, are standard features in most CPU's. Any peripheral can 'raise' an interrupt flag which stops the normal flow of program execution and directs the CPU to execute from a respective interrupt service routine. When the routine is completed, the CPU resumes its normal flow of instructions.

Figure 3:
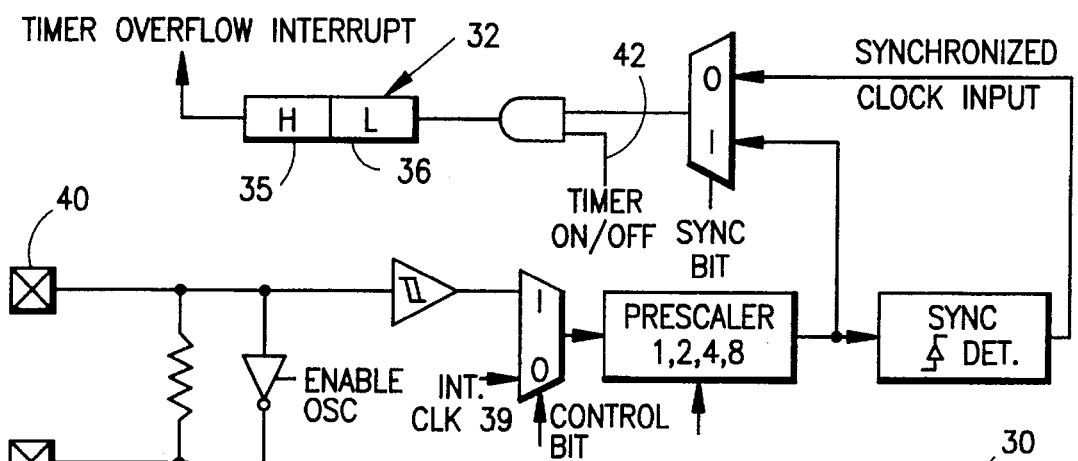
FIG. 3 is a simplified block diagram of the on-chip timer used in conjunction with the CCP™ modules.

Referring to FIG. 3, timer 32 is a 16-bit timer/counter consisting of two 8-bit sections 35 (high) and 36 (low), both of which may be read from and written to. Timer 32 may be operated in a synchronized timer mode, or in a counter mode which may be synchronized or asynchronous. In the timer mode, selected by a timer clock select bit of predetermined value, timer 32 increments on every instruction cycle, synchronized with an internal clock 39. The counter mode is synchronized if a timer sync bit is of one value, and asynchronous if the timer sync bit is of the other value. In either counter mode, timer 32 increments on every rising edge of an external clock on pin 40. The timer is set by the user to operate in the timer mode or the synchronized counter mode when any CCP™ module of the microcontroller chip is performing the capture timing function.

Timer 32 begins incrementing from a starting value to its highest value and then rolls over to restart incrementing. The timer may be turned on or off by the value of a control bit 42 from another control register (not shown) which the user can read from and write to in software at any time.

Figure 4:
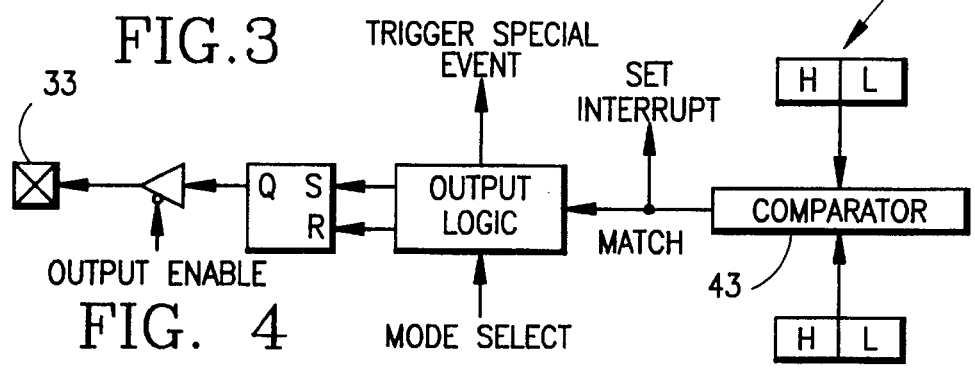
FIG. 4 is a simplified block diagram illustrating the compare mode operation of the device of FIG. 1.

Referring now to FIG. 4, in the compare mode of the device, 16-bit register 30 has a value written to it that is constantly compared against the value of timer 32 in a comparator 43 that receives inputs from both the register and the timer. When a match occurs, the pin 33 is either set or reset based on the value of a control bit. Simultaneously, a compare interrupt bit to the CPU is generated by the comparator. As with the capture mode, in the compare mode timer 32 may be selected to operate in the timer mode or the synchronized counter mode. The control bit value is selected by the user to designate any of various available events such as those mentioned earlier herein, with an effect opposite to that of the capture mode.

Figure 5A:
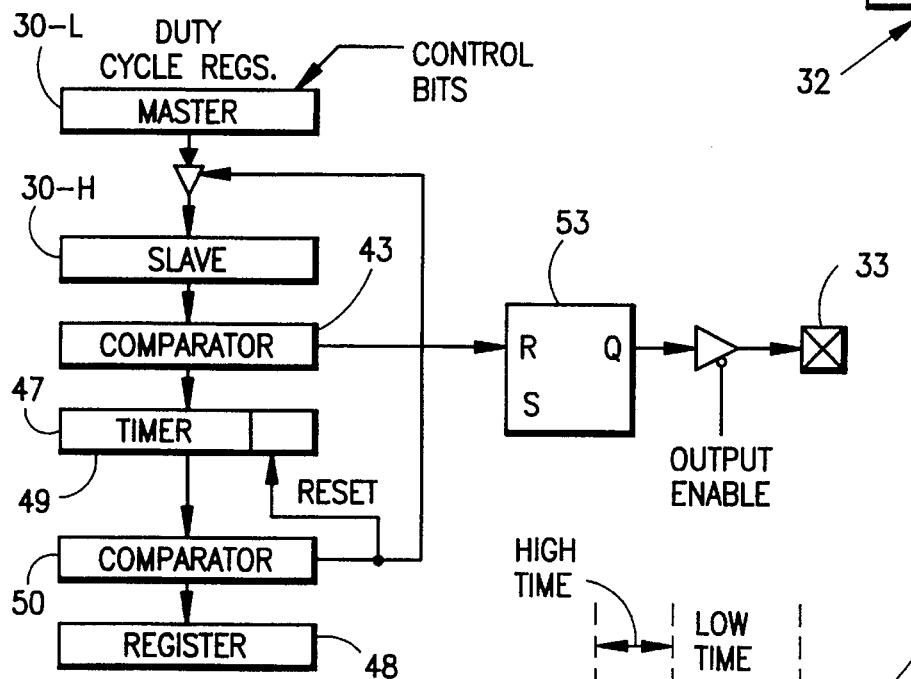
FIG. 5A is a simplified block diagram illustrating the PWM mode operation of the device of FIG. 1.
Figure 5B:
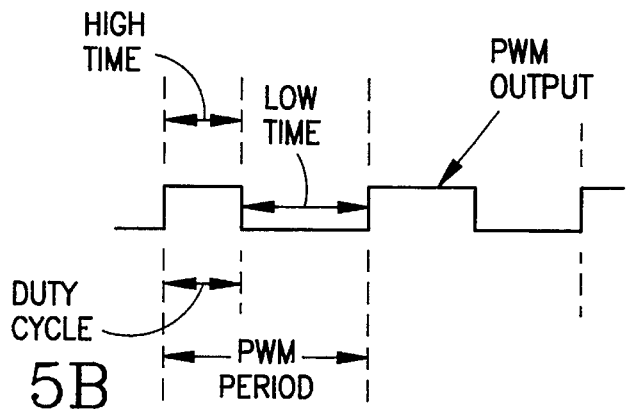
FIG. 5B is a graph illustrating various aspects of the PWM mode operation.

Referring now to FIG. 5A, the PWM mode is implemented as a repetitive digital output with a period controlled by the count of a second timer 47, and a duty cycle controlled by the value written to register 30. The duty cycle and PWM period are illustrated in FIG. 5B. Timer 47 comprises an 8-bit readable/writable register that provides the time base for the PWM module. Typically, the period is fixed and the duty cycle may be varied from period to period. In essence, the repetitive event is generated as a pulse waveform in which the width of the pulses is modulated by values programmed in the PWM module by the user at the CPU. Typically, the digital pulse waveform is converted to an analog signal for control purposes.

Register 30 is folded into two 8 bit registers 30-L and 30-H for configuration in pipelined or master/slave fashion. A value may then be written to register 30-L for the desired duty cycle so that the pulse width is modulated (changed) automatically only at the boundary, not somewhere in the middle of the pulse. A change of pulse width at a point in the middle could not be interpreted, and any new value written to accomplish that would be meaningless. Inevitably, the change will occur at the boundary because the written value from register 30-L is always transferred to register 30-H for purposes of a comparison. That is, at the end of the PWM period, the current value in master register 30-L is transferred to slave register 30-H, after which a compare function is performed by comparator 43 to generate the desired pulse width.

The period of the PWM (FIG. 5B) is determined by an 8-bit readable/writable period register 48 (FIG. 5A) associated with timer register 49 of second timer 47. As with timer 32, timer 47 may operate in either a timer mode in which an internal clock is used as the clock input, or in a counter mode in which an external clock is used and the timer increments on the rising edges of the clock input. A value is written into period register 48 to program the period of the PWM waveform, and is constantly compared against the value of the timer register 49 by a comparator 50. When a match occurs, timer register 49 is reset, and a 'match' output is generated by timer 47. An interrupt may also be generated by timer 47 to the CPU to allow a new value to be written to the period register.

The match output of the timer is applied as one input to comparator 43 of the PWM module, the other input being provided from slave register 30-H of the duty cycle determining portion of the module. When the values of the two registers 30-H and 49 are equal, an output is generated by the comparator 43 to reset a latch 53. This produces an 8-bit resolution PWM output at external pin 33. The PWM output resolution may be programmed up to a maximum of 10 bits, by concatenating the 8-bit timer register with a 2-bit internal clock state to create a 10-bit time base.

The PWM output is set at the beginning of each timer cycle and reset when the duty cycle value matches the timer (period) value. Pulse width modulation is used in a wide variety of control applications, including speed control of DC and other motors. The PWM output may be amplified through a power driver stage and fed to the motor. In effect, the output represents an analog value proportional to the duty cycle.

The invention provides a number of advantages over timing modules employed in prior art microcontrollers. For example, although plural different functions are available the interim generation can be shared between them, because only one of them is active at a given time. Thus, is not necessary to provide three different interrupt sources, because only one mode is active at any given time, allowing that functionality to be shared. Also, the same register may be used for all three timing functions or modes, and the read and write logic, address decoders, and bus drivers do not change. Hence, the registers and the manner in which they are written are also shared among the different modes, whichever is selected. Also, the 'compare' logic between the timer and the compare/PWM register is shared. Further, each mode uses only one timer as a time base (capture and compare using the first timer, and PWM using the second timer), so that resource can be shared. Also, for both the compare function and the PWM function, the setting and resetting circuit of the pin is shared because of the common functionality.

Figure 6:
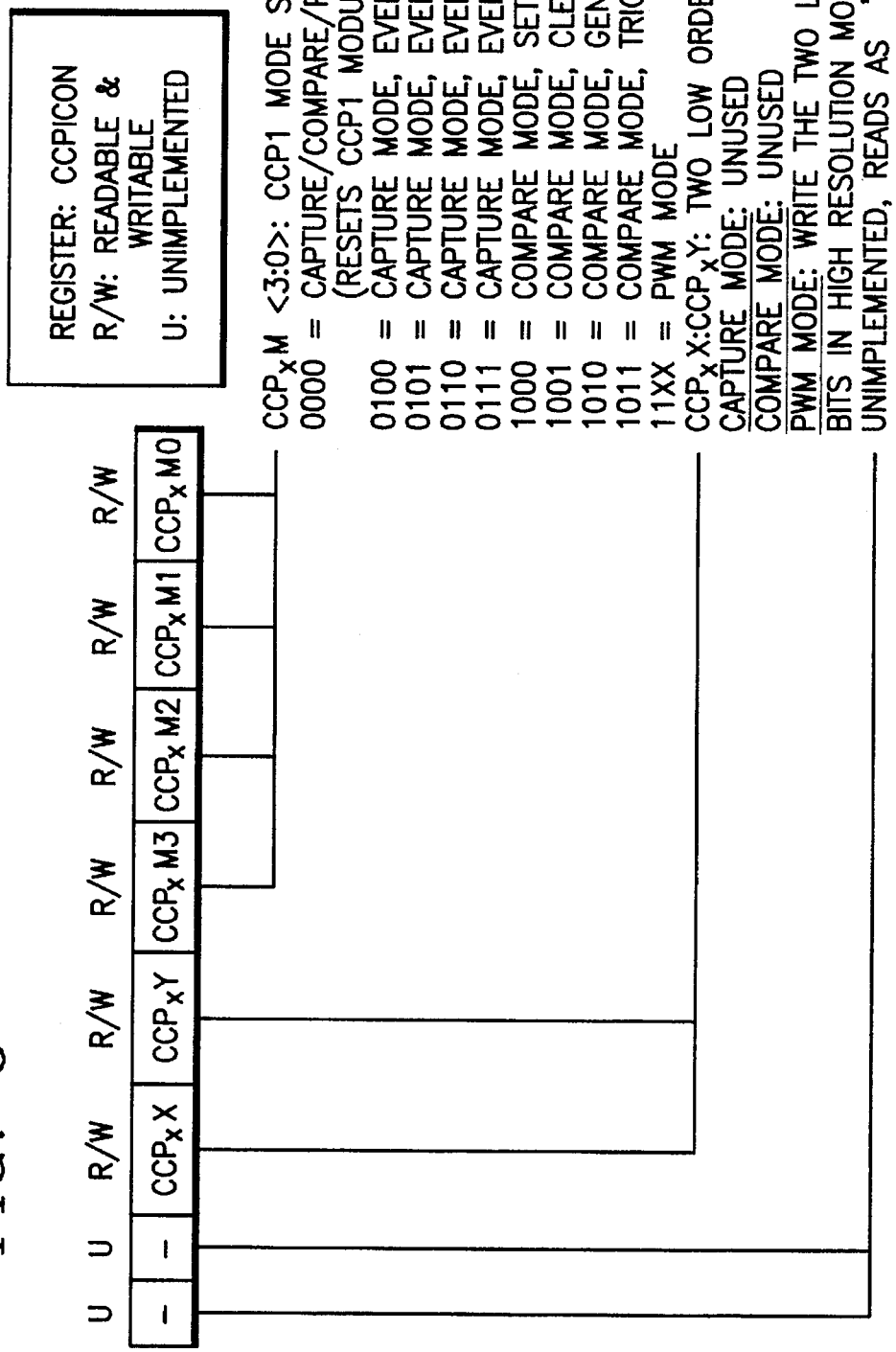
FIG. 6 illustrates an exemplary organization of a control register of one of the modules.

FIG. 6 illustrates the organization of control register CCP1CON, a simple readable and writable register for the first CCP module, CCP1. Through a software program, the user can change the register value at any time as shown at the right of the Figure.

Other CCP modules of the microcontroller chip are identical in functionality to that of the module described above.

Although the best mode presently contemplated for carrying out the invention has been described in terms of a presently preferred embodiment, it will be apparent to those skilled in the relevant field that variations and modifications may readily be implemented without departing from the true spirit and scope of the invention. Accordingly, it is intended that the invention should be limited only by the appended claims and the pertinent rules of applicable law.

What is claimed is:

1. A microcontroller device fabricated in a semiconductor chip for controlling an external system with which the device is to be installed in electrical circuit, comprising:

an on-chip program memory for storing a program to be implemented by the microcontroller device, on-chip module means for temporary storage of an event as a timing function of the microcontroller device, and means for selectively designating said module means to temporarily store any event of any of a plurality of timing functions of the microcontroller device, said module means including register means selectively configurable and reconfigurable for designating any one of said plurality of timing functions as the timing function mode of the module means.

2. The microcontroller device of claim 1, wherein:

said module means includes means for selectively configuring and reconfiguring said register means in any of a capture mode, compare mode, and a pulse width modulation (PWM) mode.

3. The microcontroller device of claim 2, wherein:

said PWM mode includes a pair of registers of equal bit length, one of said pair being writable and readable, and the other of said pair being coupled to receive a written value in the first of said pair to permit said written value to designate the boundary of a pulse of desired width and synchronization with said boundary through said other of said pair of registers.

4. The microcontroller device of claim 1, including:

means for sharing at least some of the functionality of registers, write/read modes, input/output pins, interrupt sources, and timers among the plurality of timing function modes of the microcontroller device, without regard to which timing function mode is selected.

5. In a microcontroller chip including a central processing unit (CPU) for controlling an external system with which the device is to be installed in circuit, an on-chip peripheral universal timing function module comprising:

register means for storing a value selected to signify a distinctive event in a waveform, a timer for generating a series of values as a function of time as a measure of the value selected to signify the distinctive event, means coupling said register means and said timer to a pin of the microcontroller chip on which said waveform is to be applied, means responsive to equality between the timer value and the value in said register means to signify said distinctive event as one of a capture and a compare of an event in said waveform, for generating an interrupt to said CPU, and means for selectively splitting said register means into separate master and slave registers for automatic synchronization of the transfer of a value entered into the master register to the slave register with a repetitive boundary of said waveform for selective pulse width modulation of said waveform.

6. The on-chip peripheral universal timing function module of claim 5, further including:

capture means for detecting the occurrence of said distinctive event as part of a waveform on said pin to initiate the storage of the timer value in said register means when said event occurs.

7. The on-chip peripheral universal timing function module of claim 5, further including:

compare means for effecting the occurrence of said distinctive event as part of a waveform on said pin when the timer value is equal to the value stored in said register means.

8. The on-chip peripheral universal timing function module of claim 5, further including:

a second timer for generating a sequence of values as a function of time to selectively set the period of the waveform having said repetitive boundary, and modulation means responsive to equality between a value generated by said second timer and the value transferred to said slave register for setting the duty cycle of the waveform having said repetitive boundary to pulse width modulate said waveform on said pin.

9. The on-chip peripheral universal timing function module of claim 5, further including:

function designating means for selectively designating said universal timing function module as one of:

(i) a capture module to store in said register means a value indicative of the time that a predetermined event has occurred in said waveform on said pin, (ii) a compare module to store in said register means a value indicative of the time that a predetermined event is desired to occur in said waveform on said pin, and (iii) a pulse width modulation module to store in said master register a value indicative of duty cycle as a predetermined event in the period of a repetitive waveform desired to occur on said pin.

10. A method of providing an on-chip peripheral universal timing function module in a microcontroller chip including a central processing unit (CPU) for controlling an external system with which the device is to be installed in circuit, comprising the steps of:

installing a register for storing a value selected to signify a distinctive event in a waveform, providing a timer for generating a series of values as a function of time as a measure of the value selected to signify the distinctive event, coupling said register and said timer to a pin of said chip on which said waveform is to be applied, responding to equality between the timer value and the distinctive value in said register to signify said event as one of a capture and a compare of an event in said waveform, and concomitantly generating an interrupt to said CPU, and selectively splitting said register into separate master and slave registers for automatic synchronization of the transfer of a value entered into the master register to the slave register with a repetitive boundary of said waveform when desired to pulse width modulate said waveform.

* * * * *